Sept. 15, 1925.

R. E. FULTON

GREASE RETAINER

Filed Oct. 27, 1924

1,553,767

R. E. FULTON. INVENTOR.

BY *Emil F. Lange*

ATTORNEY

Patented Sept. 15, 1925.

1,553,767

UNITED STATES PATENT OFFICE.

RALPH E. FULTON, OF LINCOLN, NEBRASKA.

GREASE RETAINER.

Application filed October 27, 1924. Serial No. 746,132.

*To all whom it may concern:*

Be it known that I, RALPH E. FULTON, a citizen of the United States, residing at Lincoln, in the county of Lancaster and State of Nebraska, have invented certain new and useful Improvements in Grease Retainers, of which the following is a specification.

My invention relates to grease retainers which are designed for the purpose of preventing the leakage of lubricants through the rear axle bearings of automobiles.

In the Ford car particularly this trouble is very common, nearly all cars of this make developing the trouble very soon after they are put into operation. The loss of the lubricant, the unsightly and dangerous character of the grease on the garage floor, and the deteriorating effect of the grease on the tires and rubber connections all combine to make a serious and expensive problem of the leakage. In brief, it is the object of my invention to provide a grease retainer which will effectively prevent the leakage of the lubricant, and which at the same time can be manufactured and sold at such a low figure as to be attractive to owners of second hand Ford automobiles.

My invention was designed initially and primarily for use on Ford automobiles and it will be described hereinafter in its relation to cars of that make. The construction and operation of the device are such as to adapt the device to other but similar uses on shafting of various kinds.

Referring now to my drawings.

Figure 2:
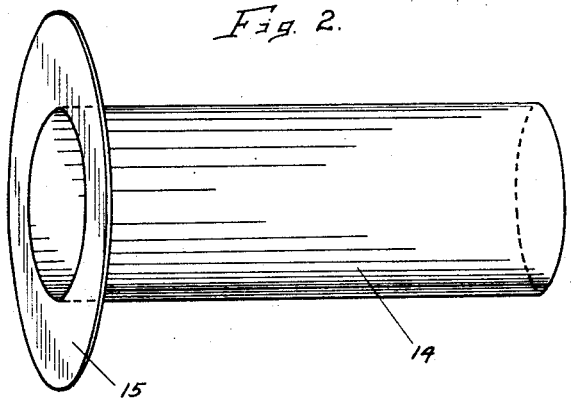
Figure 2 is a view in perspective of my retainer sleeve.
Figure 3:
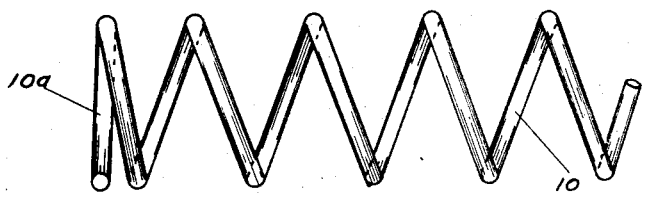
Figure 3 is a plan view of my helical conveyor.

My invention consists of the two parts shown in Figures 2 and 3. The helical coil 10 is made of any suitable material having the necessary resiliency, such as steel or brass. Its internal diameter is such that it clamps tightly on the shaft 11, which in this instance is the rear axle of a Ford car. The coil 10 grips the shaft 11 rather tightly. Because of this gripping action, considerable thrust is required to force the coil along the shaft to its proper position. For this reason I have shortened the outer or end coil 10ª as shown in Figure 3, such construction making it possible to easily position the helical coil on the shaft or to remove it therefrom. The helical coil may be made from round wire as shown or it may be formed from wire or rods having other cross sectional forms.

The helical coils 10 are formed in rights and lefts and they are positioned at the opposite extremities of the shaft 11 in a manner such that they will convey lubricant toward the center and away from the bearings at the ends of the shaft. I am aware however that helical coils as above described have been employed with the purpose of conveying lubricant away from bearings, but so far as I am aware all previous attempts have resulted in failure in practice unless provision were made for taking care of the lubricant in the housing outside the path of the rotating coil. The difficulty is occasioned by the fact that in the Ford automobile the rear axle housing 12 is provided with an inwardly projecting shoulder or reinforcement 13 which is secured to the housing by means of rivets. This shoulder of course restricts the throat of the housing and makes it difficult to introduce an effective grease retainer. If the grease retainer is made in a size to sweep the entire space between the shaft and the inner walls of the housing, it cannot be made to pass the shoulder 13 unless it is made of a yieldable material which materially increases the manufacturing cost.

I have, at very slight added cost, made the coil 10 effective by the use of the retainer sleeve shown in Figure 2, the dimensions of which have a definite relation to those of the coil 10 and of the housing 12 with its reinforcement 13. The purpose of the retainer sleeve is to reduce the housing in order to make the coil effective. It consists of a cylindrical portion 14 with an integral flange 15. The diameter of the cylindrical portion is such that the cylinder will snugly encase the coil 10 without binding. The external diameter of the flange 15 is preferably equal to the internal diameter of the housing 12.

Figure 1:
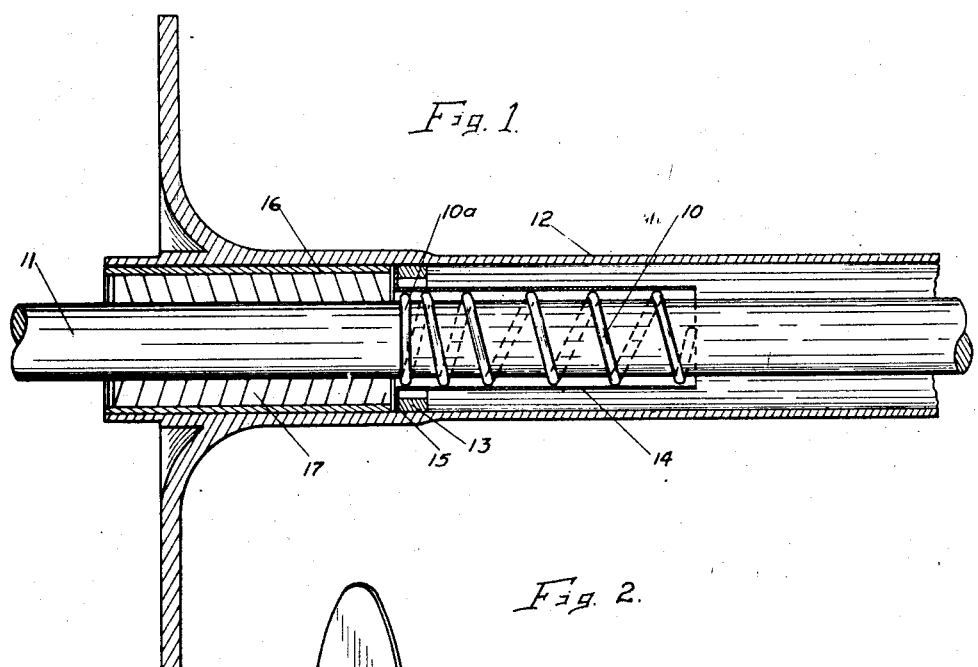
Figure 1 is a view in section of my invention as it appears when in place in a Ford automobile.

The parts are assembled as shown in Figure 1. Either the retainer coil or the retainer sleeve may be inserted first and the other afterward. The flange 15 will bear against the outer edge of the shoulder 13 and the coil should be so positioned that its outer end 10ª is just inside the plane of the flange 15. The roller bearing sleeve 16 and the roller bearings 17 should then be placed in their usual positions.

The sweep of the coil 10 is entirely inside the sleeve 14 and all portions of the interior of the sleeve are reached by the coil so that any grease which finds its way into the retainer sleeve is certain to be swept by the coil 10 toward the differential and away from the bearings 17. The flange 15 is clamped between the shoulder 13 and the bearings 17 with their sleeve 16 so that grease which is inside the housing but outside the sleeve 14 is prevented from reaching the bearings. The sleeve in effect is a reduced housing of such size that the coil 10 can be effective.

The device consists of only two parts of simple construction which can be made at very low cost. They can be inserted without making any changes or alterations in the shaft 11 or housing 12 or other parts of the automobile. The insertion of the device requires no special skill. When it is desired to gain access to the interior of the housing the device can readily be withdrawn. Its construction is all metal which is not affected by the oils and greases with which it comes in contact. Since the grease retainer is subjected to no corrosive action and to little or no wear, it will outlive two or three cars. The grease which ordinarily leaks out through the bearings is sufficient in a very short period to pay for a pair of the grease retainers which will absolutely prevent further loss of the grease.

Having thus described my invention in terms which will be readily understood by others skilled in the art to which it pertains, what I claim as new and desire to secure by Letters Patent of the United States is:—

1. A grease retainer which is adapted for use on the rear axle of an automobile having a shoulder within the rear axle housing and roller bearings abutting against the shoulder, said grease retainer including a sleeve surrounding the rear axle but spaced therefrom, an annular outwardly projecting flange integral with said sleeve, said flange being adapted to be seated between the shoulder and the roller bearings to provide an oil tight joint therebetween, and means surrounding the axle and within said sleeve for transporting lubricant in a direction away from the roller bearings.

2. A grease retainer which is adapted for use on the rear axle of an automobile having a shoulder within the rear axle housing and roller bearings abutting against the shoulder, said grease retainer including a sleeve surrounding the rear axle but spaced therefrom, an annular outwardly projecting flange integral with said sleeve, said flange being adapted to be seated between the shoulder and the roller bearings and to make an oil tight joint therebetween, and a spiral conveyer for transporting lubricant in a direction away from the roller bearings, said spiral conveyer being adapted to function throughout the entire space within said sleeve.

In testimony whereof I affix my signature.

RALPH E. FULTON.